United States Patent [19]

Barito et al.

[11] Patent Number: 4,636,415
[45] Date of Patent: Jan. 13, 1987

[54] PRECIPITATED SILICA INSULATION

[75] Inventors: Robert W. Barito; Kenneth L. Downs, both of Louisville, Ky.

[73] Assignee: General Electric Company, Louisville, Ky.

[21] Appl. No.: 699,930

[22] Filed: Feb. 8, 1985

[51] Int. Cl.$^4$ .......................... B32B 1/02; B32B 1/10; B32B 9/00
[52] U.S. Cl. ........................................ 428/68; 53/431; 53/434; 428/69; 428/76; 428/315.9; 428/446; 428/448
[58] Field of Search ............. 428/68, 315.5, 69, 315.7, 428/76, 315.9, 331, 402, 446, 448; 53/111 RC, 405, 408, 431, 434

[56] References Cited

U.S. PATENT DOCUMENTS

| | | | |
|---|---|---|---|
| 2,067,015 | 1/1937 | Munters | 220/452 |
| 2,164,143 | 6/1939 | Munters | 220/422 |
| 2,474,910 | 7/1949 | Pierce et al. | 428/402 |
| 2,513,749 | 7/1950 | Schilling | 220/422 |
| 2,768,046 | 10/1956 | Evans | 220/421 |
| 2,779,066 | 1/1957 | Gaugler et al. | 220/422 |
| 2,867,035 | 6/1959 | Patterson, Jr. | 220/452 |
| 2,961,116 | 11/1960 | Jeppson | 220/421 |
| 2,989,156 | 6/1961 | Brooks et al. | 220/422 |
| 3,094,071 | 6/1963 | Beckman | 220/422 |
| 3,166,511 | 1/1965 | Matsch et al. | 220/422 |
| 3,179,549 | 4/1965 | Strong et al. | 220/452 |
| 4,159,359 | 6/1979 | Pelloux-Gervais et al. | 428/76 |
| 4,349,051 | 9/1982 | Schilf | 138/149 |
| 4,380,569 | 4/1983 | Shaw | 428/402 |
| 4,399,175 | 8/1983 | Kummermehr et al. | 428/76 |
| 4,444,821 | 4/1984 | Young et al. | 428/69 |

Primary Examiner—William J. Van Balen
Attorney, Agent, or Firm—Frederick P. Weidner; Radford M. Reams

[57] ABSTRACT

Precipitated silica, formed by the interaction of sodium water glass and sulfuric acid, followed by mechanical processing, is employed as an insulating material having a low thermal conductivity. The precipitated silica is dried, compressed, placed in an evacuable pouch, and evacuated. The resulting board-like insulation configuration is used directly as insulation in, for example, household refrigerators.

21 Claims, No Drawings

PRECIPITATED SILICA INSULATION

BACKGROUND OF THE INVENTION

The design and development of insulation materials, including such materials for refrigeration structures, is an extensive art. Many systems have been developed employing as the major insulation materials various fibrous and powder products. There have been many ways in which such materials have been utilized, including the use of evacuated shells and bags, compression of the insulating material, and varying orientations of the material. Many of the previously developed insulating materials have proven quite adequate for the purpose as, for example, U.S. Pat. No. 2,768,046, Evans; U.S. Pat. No. 2,867,035, Patterson, Jr.; and U.S. Pat. No. 3,179,549, Strong et al, each assigned to the assignee of the present invention.

The prior art, as indicated, has described the use of powdered insulating materials enclosed within some type of container. For example, U.S. Pat. No. 2,989,156, Brooks et al, describes a heat insulating panel for refrigerators and freezers where a panel is formed from two metal sheets which are sealed, the central portion evacuated and filled with an expanded perlite. The Kummermehr et al patent, U.S. Pat. No. 4,399,175, describes the pressing of finely divided insulation material held within an outer container to form insulating slabs. An insulation system with a rigid outer wall, a flexible inner wall, and powdered insulating material in the space between the walls is described in Schilf, U.S. Pat. No. 4,349,051. A similar structure is shown in Matsch et al, U.S. Pat. No. 3,166,511. Further, hermetically sealed metallic shells filled with powdered materials are described in Munters, U. S. Pat. Nos. 2,067,015 and 2,164,143.

The use of an artificially prepared silica material as an insulating material is described in U.S. Pat. No. 4,159,359, Pelloux-Gervais et al. The artificially prepared silica material of that patent is a fumed silica formed by the heat treatment of a silane material to produce the desired silica particles. Specific parameters for the resulting fumed silica, which is a relatively expensive form of synthetically prepared silica, are set forth in that specification.

An interesting aspect of the Pelloux-Gervais et al patent is the fact that it specifically sets forth that precipitated silica powders have too high a thermal conductivity and, thus, are of no interest as insulating materials.

BRIEF DESCRIPTION OF THE INVENTION

In accordance with the present invention, and suprisingly, particularly in view of the disclosure of the Pelloux-Gervais patent, it has been found that superior insulating materials are formed employing precipitated silicas. In addition to having insulating properties which are frequently superior to those of fumed silicas, the cost of the precipitated silicas is substantially less, thus providing improved performance at lower cost.

The precipitated silicas of the present invention are formed by the interaction of an alkaline water glass and a mineral acid, by means well known in the art. They are subsequently mechanically processed, such as by spray drying and milling, to provide desirable particle sizes and surface areas.

The thus prepared precipitated silicas are heated to drive off surface water. It is frequently found advantageous to place the silica into a microporous pouch during this heating operation, merely to provide containment during processing.

Subsequent to drying of the precipitated silica powder, it is placed into a plastic envelope which, preferably, is either metallized or provided with metal foil lamina, to prevent gas leakage, and the envelope is then evacuated and sealed. If the precipitated silica has been dried in a microporous pouch, the microporous pouch can be placed directly into the plastic envelope. Either before, or during evacuation of the plastic pouch, the precipitated silica is subjected to compression to provide a desired density which allows for superior insulation with a sufficiently thin construction and at low cost. After compression and evacuation, the plastic envelopes containing the compressed precipitated silica are in, essentially, a board like form, so that they can easily be placed into the structure where insulation is to be provided, such as the walls or doors of a refrigerator or freezer.

Employing the materials and processing of the present invention, an insulation is provided which is thinner for the same insulating value than the freezer and refrigerator insulations of the prior art, or, if the same thickness, provides additional efficiency.

DESCRIPTION OF THE PREFERRED EMBODIMENTS

As previously indicated, the insulating material of the present invention is made from precipitated silica which has been produced, first, by treating an alkaline silicate with a mineral acid. The resulting product is spray-dried and milled, and is then heated to drive off surface water. The now dried silica is then placed in an essentially air and water-tight pouch where it is subjected to pressure and vacuum to form a material of board-like consistency. This material is generally from one-half to one inch in thickness and is flat. The length and width of the panel which results from the treatment is limited only by the size of the piece of equipment, such as a freezer or refrigerator, in which it is to be inserted.

When the insulation materials of the present invention are formed in the manner just described, the panels are found to have K values of approximately 0.05 BTU-IN/HR.FT$^2$°F., and even lower. It has previously been found that K values in this range are desirable for the production of refrigerators and freezers. Obviously, the insulating materials produced in accordance with the present invention provide for thinner walls with the same heat leakage and, thus, smaller outside dimensions or larger interior volumes for the pieces of equipment being insulated; or they provide for the same wall thickness, but with a more energy efficient piece of equipment.

The precipitated silicas of the present invention are formed, as indicated, by the interaction of an alkaline water glass and a mineral acid. Preferably, the alkaline water glass is a sodium water glass and the mineral acid is sulphuric acid. The white precipitate, which results from the interaction, is filtered, washed, and dried, generally resulting in a silicon dioxide content of from 86 to 88 percent, most of the remainder being water, with small amounts of salt residues formed during the reaction and trace metal oxides. Various precipitated silicas, having a variety of properties, depending upon, the composition and ratio of reactants, the reaction time, the temperature, and the concentration are available commercially. The subsequent processing of the white precipitate also affects the properties and the subsequent processing can include filtration, drying by a number of methods, grinding or milling by a number of methods, and classification. Among the properties affected by the type of processing, both of the interaction and subsequent treatment of the precipitate include the surface area, particle size, and density. In general, it has been found that surface areas of at least 150 m$^2$/g, as determined by the BET method (DIN 66 131), are useful in accordance with the present invention. Further, the silicas employed should, generally, be neutral, or slightly alkaline (pH above 6.0). Further, the agglomerate particle size of the precipitated silicas employed in accordance with the present invention are preferably under 50 micrometers, more preferably below 10 micrometers.

In forming the insulating panels of the present invention, the commercially obtained, precipitated silica, is first dried. If desired, the silica may be placed in a microporous pouch, the pouch merely used as an aid in holding the powdery silica during the drying operation. If it is desired to use such a microporous material, among the materials which can be employed is a polypropylene, sold by Celanese under the name "Celgard." Additionally, the types of paper used as filter paper can be employed. In general, any material which allows the passage of air and moisture, but holds the finely divided silica can be used.

In the drying operation, whether or not the microporous pouch is employed, the temperature should be sufficient to drive off the surface water. Generally, this means, when a microporous pouch is employed, a temperature of approximately 100° C., the upper limit being one at which the microporous material will not char, melt, or degrade.

Subsequent to the drying operation, the dried silica is pressed to form a cake which has a density in the range from about 10 to 20 pounds per cubic foot, preferably, 10 to 13 pounds per cubic foot. The materials employed in accordance with the present invention, with such densities, provide the desired K-factor of 0.05 BTU-IN/HR.FT.$^2$°F., or lower. The dried silica is placed into a further plastic pouch, this plastic pouch being formed in such a way as to prevent gas leakage. If the silica has been dried in a microporous pouch, the microporous pouch is merely placed into the plastic envelope. In general, gas leakage is prevented in the plastic envelope either through use of thin, metal foil laminas, or by metallizing one or more layers of the plastic in a multilayer envelope. For example, a type of plastic envelope which has been found useful in accordance with the present invention is one formed from six layers of a polymer, such as polypropylene, three of those layers being aluminized to provide a gas barrier.

The overall thickness of the plastic envelope should be small enough that there is little conduction of heat through the edges. In general, the overall thickness should be from approximately 0.003 to 0.020 inch. While the thinner materials provide sufficient strength to hold the silica and allow the further processing necessary, the life expectancy of the apparatus into which they are placed may be reduced. However, life expectancies of five years, and more, can be expected even with the 0.003 thickness envelope.

After placing of the dried silica into the plastic envelope, the envelope is evacuated and sealed by any suitable means, e.g., heat sealing or adhesive bonding. Preferably, an internal pressure below 10 mm. Hg is desired, though, depending upon the filler material, a slightly higher pressure, for example in the range of 15 mm. can be tolerated. The amount of vacuum necessary is based upon the K factor which, as indicated, should be no higher than 0.05. If desired, prior to evacuation, an inert gas, such as carbon dioxide or nitrogen, can be used to purge the air from the envelope.

The following are examples of the practice of the present invention. It should be considered only as exemplary, and not as limiting in any way the full scope of the present invention.

EXAMPLE I

A thermal insulation panel was prepared by first charging approximately 300 gms. of precipitated silica into a microporous pouch. The microporous pouch was formed of the material sold under the name "Celgard," and the precipitated silica was that sold by Degussa under the designation FK-310. The referenced precipitated silica has a surface area of 650 m$^2$/g by the BET method, an average agglomerate size of 5 microns, a tapped density of 130 g/l, a pH of 7, a DBP absorption of 210, and a sieve residue, according to DIN 53 580 of 0.01. After placing of the precipitated silica into the microporous envelope, the fourth side of the microporous envelope was heat sealed and the panel was then placed in an oven and held at 96° C. for 16 hours.

The dried silica in the microporous pouch was then placed into a metallized plastic envelope that had been fitted with an evacuation port. The envelope employed had, as previously described, six layers of laminated polymeric film, three of which had been aluminized, the overall thickness of the envelope being 0.004 inch. After placement of the microporous pouch into the metallized plastic envelope, the envelope was sealed, except for the evacuation port, the panel was compressed to a density of 19.4 pounds per cubic foot and a thickness of 0.626 inch, while evacuating to 0.7 torr.

The resulting panel was placed into a conductivity tester and found to have a C of 0.066 BTU/HR-FT$^2$°F., yielding a K-factor of 0.041 BTU-IN/HR FT$^2$°F.

EXAMPLE II

The effect of the vacuum on insulating properties was determined, employing another precipitated silica sold by Degussa under the designation FK500-LS which was prepared as in Example I, except that the density of the final product was 12 pounds per cubic foot, and the thickness of the final panel was 0.715 inch. By inducing a slow vacuum leak the following data were obtained:

TABLE I

| Internal Panel Pressure (torr) | Thermal Conductivity | |
| --- | --- | --- |
| | C (BTU/HR FT$^2$ °F.) | K (BTU-IN/HR FT$^2$ °F.) |
| 0.7 | 0.049 | 0.035 |
| 2.3 | 0.050 | 0.035 |
| 3.3 | 0.054 | 0.039 |
| 4.0 | 0.055 | 0.039 |
| 5.1 | 0.056 | 0.040 |
| 6.0 | 0.057 | 0.041 |
| 6.7 | 0.60 | 0.043 |
| 7.6 | 0.061 | 0.044 |
| 8.5 | 0.062 | 0.044 |
| 9.2 | 0.064 | 0.046 |
| 10.0 | 0.066 | 0.047 |
| 12.0 | 0.068 | 0.049 |
| 13.0 | 0.070 | 0.050 |
| 14.0 | 0.071 | 0.051 |

TABLE I-continued

| Internal Panel Pressure (torr) | Thermal Conductivity C (BTU/HR FT² °F.) | K (BTU-IN/HR FT² °F.) |
|---|---|---|
| 15.0 | 0.071 | 0.051 |
| 16 | 0.073 | 0.052 |
| 55 | 0.116 | 0.083 |
| 75 | 0.132 | 0.094 |
| 200 | 0.172 | 0.123 |
| 760 | 0.238 | 0.170 |

EXAMPLE III

Other precipitated silicas were tested employing the same conditions and materials as otherwise employed in Example I. The results obtained are set forth in the following table:

TABLE II

| Material | Packed Density (LBS/FT³) | Internal Panel Pressure (mm Hg) | K Factor (BTU-IN/HR FT² °F.) |
|---|---|---|---|
| Degussa | | | |
| Sipernat 22LS | 11.9 | 0.16 | 0.031 |
| Sipernat 22S | 15.4 | 0.05 | 0.43 |
| Sipernat 50 | 14.1 | 0.10 | 0.054 |
| Sipernat 50S | 14.1 | 0.07 | 0.051 |
| PPG | | | |
| HI-SIL T600 | 11.8 | 0.04 | 0.032 |
| HI-SIL GM | 18.2 | 0.10 | 0.064 |
| Lo-vel 39A | 17.8 | 0.095 | 0.052 |
| Lo-vel 27 | 11.7 | 0.075 | 0.036 |

By way of further description, the Sipernat 22S described above has, with the same tests as for the FK310, a BET surface area of 190, an average agglomerate size of 7, a tapped density of 120 g/l, a pH of 6.3, a DBP absorption of 270, and a sieve residue of 0.1. The Sipernat 22LS has a BET surface area of 170, an average agglomerate size of 4.5, a tapped density of 80, a pH of 6.3, a DBP absorption of 270, and a sieve residue of 0.01. The Sipernat 50 has a BET surface area of 450, an average agglomerate size of 50, a tapped density of 200, a pH of 7, a DBP absorption of 340, and a sieve residue of 0.5. The Sipernat 50S has a BET surface area of 450, an average agglomerate size of 8, a tapped density of 100, a pH of 7, a DBP absorption of 330, and a sieve residue of 0.1. The silica T600 has a median agglomerate size of 1.4 micrometers, an average ultimate particle size of 21 nanometers, a surface area of 150 square meters per gram, a pH of 7.0, a bulk density, tapped, of 3–4 pounds per cubic foot.

In accordance with the present invention, the use of a precipitated silica as an insulating material for apparatus, particularly cooling appliances, has been shown and described. A variety of such precipitated silicas have been shown, and the invention should not be considered as limited to the specific examples, but only as shown and described in the appended claims.

We claim:

1. A slab of board-like material for use as thermal insulation comprising:
   a. finely divided silica material formed by the interaction of an alkaline water glass and a mineral acid to precipitate silica, followed by a drying action to form a dried, finely divided silica; and
   b. a gas and water-tight envelope containing said dried, finely divided silica.

2. The material of claim 1 wherein said alkaline water glass is sodium water glass and said mineral acid is sulphuric acid.

3. The material of claim 1 wherein said finely divided, precipitated silica is dried in a microporous pouch.

4. The material of claim 3 wherein said microporous pouch is placed within said gas and water-tight envelope.

5. The material of claim 1 wherein said gas and water-tight pouch, containing said finely divided, dried silica is compressed to a density of between 10 and 20 pounds per cubic foot.

6. The material of claim 5 wherein said density is between 10 and 13 pounds per cubic foot.

7. A process for forming an insulating material comprising:
   a. precipitating a finely divided silica by the interaction of an alkaline water glass and a mineral acid.
   b. drying said finely divided, precipitated silica at a temperature sufficient to drive off surface water;
   c. compressing said dried precipitated silica to a density of from 10 to 20 pounds per cubic foot;
   d. placing said dried silica in a gas and water-tight envelope having an evacuation opening:
   e. evacuating said gas and water-tight envelope;
   f. sealing the evacuation opening to said gas and water-tight pouch.

8. The process of claim 7 wherein said alkaline water glass is sodium water glass and said mineral acid is sulphuric acid.

9. The process of claim 7 wherein said precipitated silica is dried in a microporous pouch.

10. The process of claim 7 wherein said gas and water-tight envelope is a multi-layer structure formed of plastic having metallized layers.

11. The process of claim 7 wherein said drying temperature is approximately 100° C.

12. The process of claim 10 wherein at least one of said metallized layers is an aluminized plastic layer.

13. The process of claim 10 wherein at least one said plastic layers is formed of polypropylene.

14. The process of claim 10 wherein at least one of said layers is an aluminum foil lamina.

15. The process of claim 7 wherein said evacuation results in an internal pressure of no greater than 15 torr.

16. An insulating material comprising a finely divided precipitate of silica.

17. The material of claim 16 wherein said precipitate is formed by the interaction of an alkaline water glass and a mineral acid.

18. The material of claim 17 wherein the water glass is sodium water glass and the mineral acid is sulphuric acid.

19. The material of claim 16 wherein said agglomerated particle size is less than 50 micrometers.

20. The insulating material of claim 16 wherein said finely divided silica is compressed to a density of from 10 to 20 pounds per cubic foot.

21. The insulating material of claim 20 wherein said density is from 10 to 13 pounds per cubic foot.

* * * * *